(12) United States Patent
Ma

(10) Patent No.: US 11,754,750 B1
(45) Date of Patent: Sep. 12, 2023

(54) METHOD AND SYSTEM FOR SHORT TO LONG-TERM FLOOD FORECASTING

(71) Applicant: Jack T Ma, West Lafayette, IN (US)

(72) Inventor: Jack T Ma, West Lafayette, IN (US)

(73) Assignee: ENTROPIC INNOVATION LLC, West Lafayette, IN (US)

( * ) Notice: Subject to any disclaimer, the term of this patent is extended or adjusted under 35 U.S.C. 154(b) by 0 days.

(21) Appl. No.: 18/171,320

(22) Filed: Feb. 17, 2023

(51) Int. Cl.
*G06F 16/29* (2019.01)
*G01W 1/10* (2006.01)
(52) U.S. Cl.
CPC .......... *G01W 1/10* (2013.01); *G06F 16/29* (2019.01); *G01W 2201/00* (2013.01)
(58) Field of Classification Search
CPC ...... G01W 1/10; G01W 2201/00; G06F 16/29
See application file for complete search history.

(56) References Cited

U.S. PATENT DOCUMENTS

| | | | |
|---|---|---|---|
| 10,488,556 B2 | 11/2019 | Kodra et al. | |
| 10,871,594 B2 | 12/2020 | Tocornal et al. | |
| 11,150,380 B2 * | 10/2021 | Yamakawa | G01W 1/14 |
| 11,300,708 B2 | 4/2022 | Bueno Buoro et al. | |
| 11,457,576 B2 | 10/2022 | Huang et al. | |
| 11,519,146 B2 | 12/2022 | Wani et al. | |
| 11,662,502 B2 * | 5/2023 | Elkabetz | G01S 13/95 702/3 |

OTHER PUBLICATIONS

Ahmad et al., 'Development of Machine Learning Flood Model Using Artificial Neural Network (ANN) at VAR River', 2022, ADPI Publication, pp. 147-160 (Year: 2022).*
Dhunny et al., 'Flood Prediction Using Artificial Neural Networks: Empirical Evidence from Mauritius as a Case Study', Aug. 2020, Research Gate Publication, pp. 1-11 (Year: 2020).*

* cited by examiner

Primary Examiner — Elias Desta

(57) ABSTRACT

A method and system is presented for short to long-term flood forecasting. At the core of the method is a neural network-based flood forecasting model. The method and system performs the steps to implement and use the neural network-based flood forecasting model comprising obtaining historical data from the region, including but not limited to climate and water level data; sampling and structuring the historical data in conjunction with data queried from a GIS (geographic information system) into a dataset; dividing the dataset into pre-processed training and validation partitions; configuring the neural network and training hyperparameters; training the neural network-based flood forecasting model on the pre-processed training partition; performing validation on the neural network-based flood forecasting model with the pre-processed validation partition. Embodiments of the invention are capable of performing flood forecasting over a region in short to long-term time intervals.

4 Claims, 5 Drawing Sheets

200 Historical Data

205 Precipitation Data

210 Temperature Data

215 Water Level Data

FIG. 2

METHOD AND SYSTEM FOR SHORT TO LONG-TERM FLOOD FORECASTING

CROSS-REFERENCE TO RELATED APPLICATIONS

The present application does not reference or claim a priority date from any other application.

BACKGROUND OF THE INVENTION

Currently, flooding is a major problem that is only expected to increase in magnitude and frequency as climate change worsens. To better prepare for such events, accurate forecasting methods are needed to predict when and where flooding could happen. Current flood forecasting methods are limited in scope in numerous and often-coincident ways. For example, they might only give short-term forecasts, they might not take regional differences into account due to the multitude of factors (e.g. precipitation and temperature) that differ from region to region, or they might operate at too low of a geographic resolution to adequately inform those potentially impacted by flooding. Thus, an accurate end-to-end method to predict flood susceptibility with high resolution across multiple time horizons and regions is needed, which establishes the grounds for the present invention.

SUMMARY OF THE INVENTION

The present invention lays out a method incorporating a neural network that uses data comprising historical data and data queried from a GIS (geographic information system) to forecast the likelihood of flooding in any region in the short to long term, as well as a corresponding system.

In some embodiments, the present invention is a method capable of predicting flooding likelihood in a given region over short to long term time intervals. At the core of the method is a neural network-based short to long-term flood forecasting model. The method for generating the neural network-based flood forecasting model comprises the following steps: (1) obtaining historical data from the region, including but not limited to climate (precipitation, temperature) and water level data, (2) sampling and structuring the historical data in conjunction with data queried from a GIS (geographic information system) into a dataset, (3) dividing the dataset obtained in step (2) into pre-processed training and validation partitions, (4) configuring neural network and training hyperparameters for the neural network-based flood forecasting model (e.g. model architecture such as the number of layers in the neural network), (5) training the neural network-based flood forecasting model on the pre-processed training partition, and (6) performing validation on the neural network-based flood forecasting model with the pre-processed validation partition.

In some embodiments, the neural network employs a modification of a contraction-expansion ("U-Net") architecture, built with a set of layer types comprising convolutional, rectified linear (ReLU), sigmoid, max pooling, up convolution (that is, transposed convolution), and concatenation layers.

In some embodiments, the historical data takes on modalities including: precipitation, temperature, and water level.

In some embodiments, the neural network, once trained and validated, is used inferentially to fulfill client requests for predicting future flood susceptibility across multiple time horizons and regions with high resolution.

In some embodiments, the system used to perform the method comprises an input device, an output device, connection to a GIS, at least one computing device (which comprises at least one processor and RAM (random access memory)), and a non-transitory physical storage medium to store historical data, program code, the operating system, and any other information generated when the computing device runs the program code. When the processor reads and executes the program code through the operating system, the computing device preprocesses the data comprising historical data (coming from the region and from a multitude of sources, including but not limited to climate (precipitation, temperature) and water level data) and data queried from a GIS into a dataset, divides the dataset into training and validation partitions, trains the flood forecasting model on the pre-processed training partition, and performs validation on the flood forecasting model with the pre-processed validation partition. Furthermore, such a system can be used to run the trained and validated neural network inferentially to fulfill client requests for predicting future flood susceptibility across multiple time horizons and regions with high resolution.

BRIEF DESCRIPTION OF DRAWINGS

FIG. 2 is a diagram showing the composition of historical data, which includes (but is not limited to) precipitation, temperature, and water level data.

In FIG. 4, each representation is depicted as a shaded box and its dimensions are specified by the values at the top and the bottom of the box. The value at the top represents the number of channels for the representation, and the value at the bottom of the box, say w, represents the dimensions of each channel in the representation, where the dimensions are w by w. I_1, I_2, and I_3 (depicted by the black border boxes) represent input tensors that have the same dimensions as the full-resolution tensor, half resolution tensor, and quarter resolution tensor respectively for the input of a data instance. Dimensions for I_1, I_2, and I_3 are represented in FIG. 4 in the same fashion as dimensions in the representations are represented. In FIG. 4, the solid arrow pointing downwards represents a max pool 2×2 layer, the circle with a plus sign contained within it is a concatenation layer, the solid arrow pointing up represents the up convolution 2×2 layer, the solid arrow with a short stem pointing to the right represents a convolution 1×1 layer followed by a ReLU activation function, and the solid arrow with a long stem pointing to the right (only used once, at the very right of the figure) represents a convolution 1×1 layer followed by a sigmoid activation function (to squeeze values into the range (0,1)).

DETAILED DESCRIPTION OF THE INVENTION

The present invention is a method and system for flood forecasting designed to predict short-to-long term flooding likelihoods across a rectangular fixed region given past historical data and current geographic features queried from a GIS (geographic information system). It is assumed that the GIS contains the necessary information and computational processing functionality to answer these queries. In this section, the technical aspects of the present invention will be laid out in detail.

A 128 km by 128 km square patch of land will hereafter be referred to as a "patch". It is assumed that the above-mentioned fixed region is strictly larger than the size of a patch in each dimension.

Figure 1:
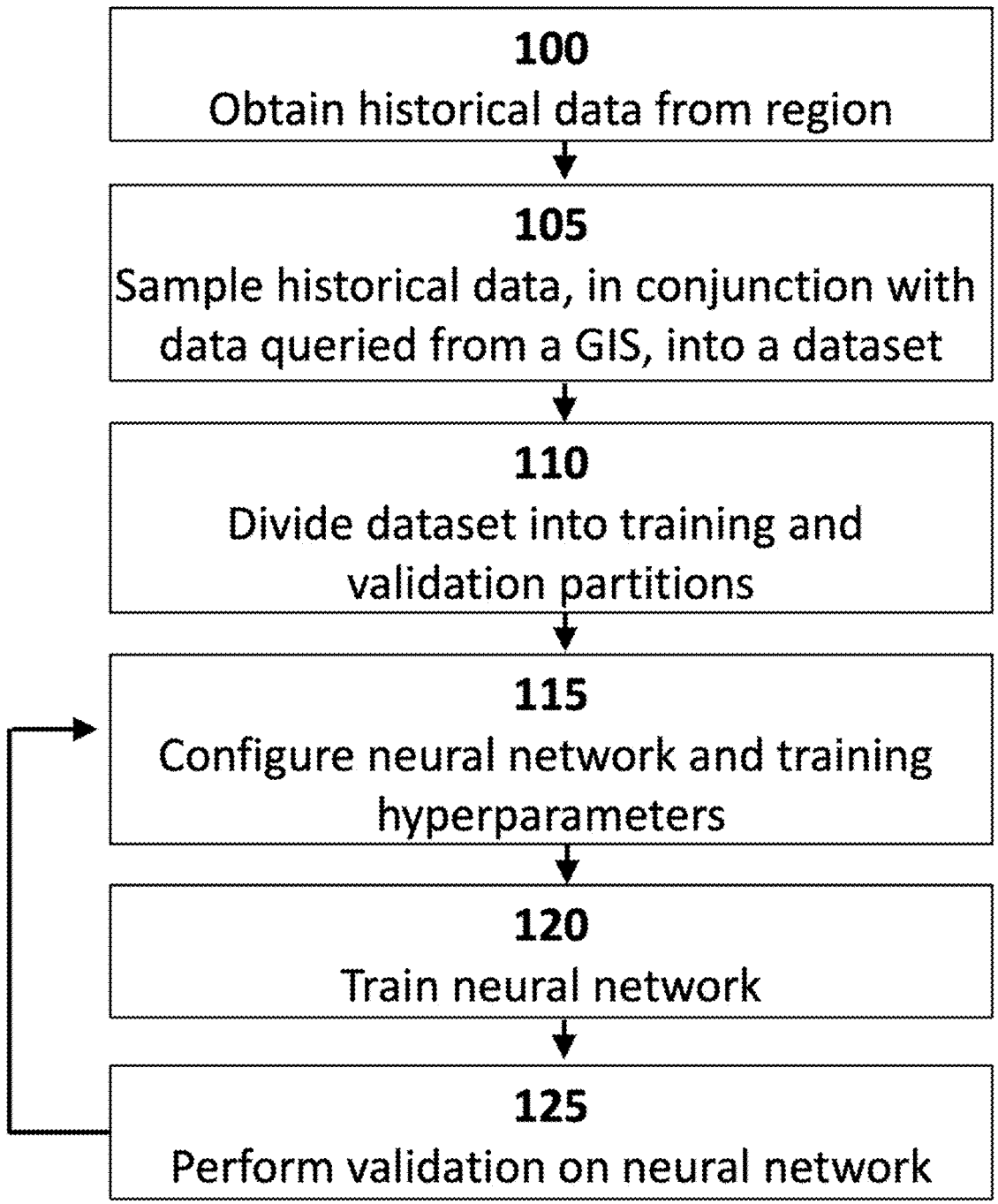
FIG. 1 is a flowchart outlining the method of short to long-term flood forecasting.

The method comprises 6 steps which are laid out as a flowchart in FIG. 1.

Step 1: historical data is obtained from the fixed region as referenced in 100 from FIG. 1. FIG. 2 shows the components of historical data 200, which includes (but is not limited to) precipitation data 205, temperature data 210, and water level data 215.

Before proceeding, some specifications must be made. Define a type 1 point to be any position specified by latitude/longitude coordinates and altitude. Type 1 points are used to obtain temperature data (because temperatures can vary across different altitudes holding fixed latitude/longitude coordinates). Define a type 2 point to be any position solely specified by latitude/longitude coordinates. Type 2 points are used to obtain precipitation data, since, for each latitude/longitude pair, there is a unique value for these metrics, obviating the need for an additional elevation dimension. A point, regardless of the type, is said to be contained within the fixed region if its coordinates are contained within the set of all coordinates defining the region.

The precipitation data comprises all available recorded daily precipitation amounts, in millimeters (mm), for any type 2 points contained within the fixed region. The temperature data comprises all available recorded daily lowest and highest temperatures for any type 1 points contained within the fixed region. Temperature data is in Kelvin and is therefore always nonnegative when it exists. The water level data comprises all available daily water levels for any type 2 points contained within the fixed region. The daily water level for a type 2 point is the maximum water level at that point throughout the day. Water level data is in millimeters (mm).

Step 2: historical data is sampled and structured, in conjunction with data queried from a GIS (geographic information system) into a dataset as referenced in 105 from FIG. 1. Each data instance comprises an input and target pair and is determined by a patch and a reference date. Data instances are sampled uniformly across all ordered pairs (patch, reference date) wherein (1) the patch is wholly contained within the fixed region, (2) the patch contains at least 1 square kilometer of land (to account for small areas of land such as islands), (3) the data instance contains at least 50% of its input, (4) the target of the data instance is nonempty, and (5) the reference date is within the fixed date interval of the historical data whose endpoints are the earliest and latest days for which historical water level data exists. In some embodiments, sampling is performed by (1) randomly selecting a (patch, reference date) pair, (2) obtaining the data instance from the (patch, reference date) pair if the pair is valid (i.e. satisfies the five conditions listed above), and (3) repeating steps (1) and (2) until the desired number of data instances (i.e. the dataset size) is obtained.

A data instance contains at least 50% of its input when all three tensors that constitute the input for the data instance contain at least half of its information (i.e. at least half of the elements in each tensor are not set to −1). The information required to constitute the tensors that make up the input for the data instance, including the criteria for a specific element in a tensor to take on the value −1, is specified starting from paragraph 24.

The target of the data instance is nonempty if there is some nonnegative value present in the target (i.e., at least one value in the target is not −1). The information required to constitute the target for the data instance, including the criteria for a specific element in the target to take on the value −1, are specified starting from paragraph 39.

A reference date is a date from which time can be structured and should be interpreted as the "current date" for that data instance. For example, if the reference date is Jan. 6, 1970, then the past decade for that data instance would be Jan. 6, 1960 to Jan. 6, 1970, not the past decade relative to today's date or any other date that is not the reference date.

The paragraphs below contain specifications for the input of a data instance that is determined uniquely by the data instance's patch and reference date.

The input of a data instance comprises some number of channels (such number hereinafter denoted as T) of varying resolutions (i.e. dimensions). In some embodiments, the data input comprises 355 channels (that is, T=355). Because different types of historical data are available at different resolutions, we allow for the categorization of channels into 3 resolution classes: full resolution (256×256), half resolution (128×128), and quarter resolution (64×64). Thus, the input can be structured by three different resolution tensors. The first tensor is structured as F channels with each channel having dimensions 256 by 256 (the first tensor is called the full resolution tensor), the second tensor is structured as H channels with each channel having dimensions 128 by 128 (the second tensor is called the half resolution tensor), and the third tensor is structured as Q channels with each channel having dimensions 64 by 64 (the third tensor is called the quarter resolution tensor). For each channel, the elements in the channel can be viewed as pixels that divide the patch into equal-sized square areas and thus represent unique areas of the patch. For instance, for a channel in the full resolution tensor, each pixel in the channel represents a 0.5 km by 0.5 km area of the 128 km by 128 km patch, while each pixel for a channel in the half resolution tensor represents a 1 km by 1 km area of the patch. We place the following constraints: $F+H+Q=T$, $F>0$, $H\geq 0$, and $Q\geq 0$. Based on the availability and resolution of historical data, the channels associated with different types of historical data can be in different resolution tensors. Based on the current availability and resolution of historical data, the inventor contemplates as the best mode putting historical precipitation data channels in the quarter resolution tensor, the historical temperature data in the half resolution tensor, and all other channels into the full resolution tensor, which would result in F=16, H=308, and Q=31.

Historical precipitation data comprises 31 channels of the input, and can be placed into either of the three resolution tensors depending on the availability and resolution of historical data. Each channel represents a different time window. Five channels are defined by consecutive decade-long windows that span the past 50 years (one channel per window). Ten channels are defined by consecutive one year long windows that span the past decade (one channel per window). Twelve channels are defined by consecutive one month long windows that span the past year (one channel per window). Four channels are defined by consecutive one week long windows that span the past 28 days (one channel per window). Note that the time windows overlap more frequently as they near the reference date. This is deliberately done to put more emphasis on more recent data that might be more relevant than older data. For each precipitation channel, the value for a pixel in the channel is the maximum precipitation over the time interval for the channel. The method for calculating the maximum precipitation over the time interval for a given pixel is described below.

Let the area of the patch that is represented by the pixel be denoted as the area. The precipitation amount in the area for a day (i.e. daily precipitation amount) is calculated by taking the average of all available precipitation amounts for that day across type 2 points in the area. If there are no type 2 points in the area for which there is historical information for the daily precipitation amount for the point, then the daily precipitation amount is deemed invalid.

The precipitation amount in the area over a contiguous seven-day window is calculated by taking the sum of all seven consecutive daily precipitation amounts for the area within the seven-day window. If at least one of the seven daily precipitation amounts is invalid, then the precipitation amount over the contiguous seven-day window is invalid.

The maximum precipitation over the time interval is calculated by taking the maximum of all valid precipitation amounts over contiguous seven-day windows contained in the time window, where the start of each seven-day window is at the start of a day (i.e. at 12AM local time). If the maximum precipitation is incalculable (i.e. there are no valid precipitation amounts over contiguous seven-day windows contained in the time window), then the pixel value is set to $-1$.

Historical temperature data comprises 308 channels of the input, and can be placed into either of the three resolution tensors depending on the availability and resolution of historical data. The historical temperature data spans 22 different time windows: 10 one year long windows that span the past decade and 12 one month long windows that span the past year. Each time window is represented by 14 channels that are determined by picking one of [daily low, daily high] and a set operator chosen from [minimum, 5th percentile, 25th percentile, median, 75th percentile, 95th percentile, maximum]. The value for a pixel in a channel is calculated by taking the ordered set (from low to high) of temperatures comprising values T_day for each day in the time period, then applying the chosen operator on the set to obtain the pixel value. T_day for a given day is equal to the average of the available daily low or daily high for that day (depending on which of the two possible parameters was chosen for the channel) for all type 1 points in the area represented by the pixel, where the altitude of the type 1 point is positive and less than or equal to 50 meters.

If the set of temperatures is empty, then the pixel value is set to $-1$. If the set of temperatures is nonempty, the procedure of applying the chosen operator to the ordered set of temperatures is as follows. If the operator is minimum or maximum, simply take the minimum or maximum respectively of the set of temperatures. If the operator is a percentile, say the xth percentile where x is any number from the set [5,25,75,95], then number the elements of the ordered set of temperatures from low to high starting from 0. Call the number assigned to each element the index of that element. Then the pixel value is the element at index i of the ordered set of temperatures given by the formula i=floor(x*n/100) where n is the number of elements of the ordered set and floor(r) for any real number r returns the largest integer less than or equal to r.

Since the area defined by a pixel is in the shape of a square, we define the middle point of that area to be the type 2 point at the center of the square-shaped area. Note that for a given pixel, there is a unique middle point for the area represented by the pixel.

Figure 3:
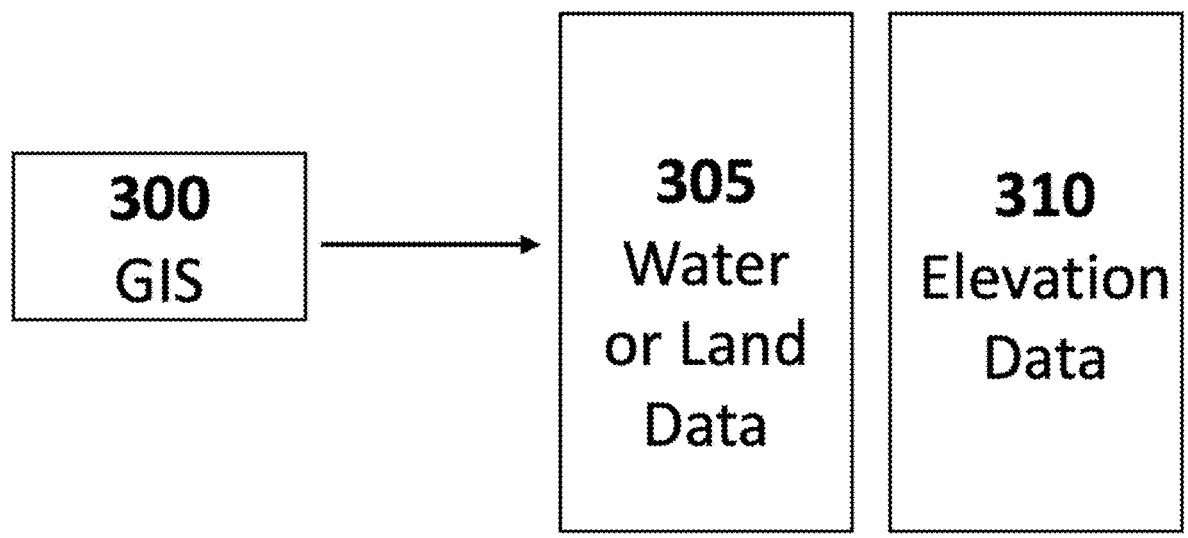
FIG. 3 is a diagram showing the composition of data that is queried from the GIS (geographic information system), which includes (but is not limited to) the most recent elevation data and water or land data.

As referenced in FIG. 3, the most recent water or land data 305 and elevation data 310 are queried from a GIS (geographic information system) 300. Querying is used in constructing two geographic information channels of a given resolution tensor. In some embodiments, these two channels are placed into the full resolution tensor because GIS data is usually available at fine-grained resolutions.

The first channel constructed via GIS querying provides elevation data for the patch. Each pixel value is determined by querying the most recent elevation at the middle point of the area represented by the pixel from the GIS.

The second channel constructed via GIS querying provides information distinguishing bodies of water from land in the patch. For each pixel, the most recent information for whether the middle point of the area represented by the pixel is water or land is queried from the GIS. The pixel's value is set to 1 if the middle point for the area represented by the pixel is land and 0 otherwise.

Since seasonal information can also be useful (for example, it is usually less likely to flood on Dec. 29th than on Mar. 4th), the reference date (excluding the year) is included explicitly in each input through fourteen channels in the input, described herein as "current-state" channels. In some embodiments, these fourteen channels are placed into the full resolution tensor because given the reference date, it is always possible to construct these fourteen channels with no missing information, and would thus reasonably fulfill the requirement that the full resolution tensor has to contain a nonzero number of channels.

Two current-state channels are sinusoidal channels that capture the number of days since Jan. 1st of the current year of the reference date by filling all pixels of one channel with $\sin(2\pi * (d/N))$ and filling all pixels of the other channel with $\cos(2\pi * (d/N))$, where d is the number of days between the reference date and Jan. 1st of the reference date year, and N is the number of days in the year of the reference date (365 in non-leap years and 366 in leap years). Note that when computing d, Jan. 1st of the reference date year counts towards d, but the reference date does not. Since d is in the interval $[0, N-1]$, $2\pi * (d/N)$ lies in the interval $[0, 2\pi)$. Among the advantages of this technique is that the values $\sin(2\pi * (d/N))$ and $\cos(2\pi * (d/N))$ are sufficient information to reconstitute d within a given year.

The remaining twelve current-state channels encode the current month in "one-hot" form. This serves to give the model access to coarser-grained temporal information to supplement the high-resolution information of the two sinusoidal channels. Each of the remaining twelve current-state channels represents a unique month (so that there is one channel representing January, another representing February, and so on through December). For each channel, all values in the channel are set to one if the month of the reference date is the month represented by the channel and are set to zero otherwise.

The paragraphs below contain specifications for the target of a data instance that is determined uniquely by the data instance's patch and reference date.

The target of a data instance is structured as 36 channels, with each channel having dimensions 256 by 256, whose elements can be viewed as pixels. Each pixel divides the patch corresponding to the data instance into equal-sized areas and thus represents a unique area of the patch.

Water level is an apt way to quantify flood likelihood since water level directly characterizes the severity of flooding. In light of this, each channel in the target is characterized by (1) a time interval beginning with the reference date and spanning one of [1 week, 1 month, 1 year, 5 years, 10 years, 30 years] and (2) a threshold [50 mm, 100 mm, 150 mm, 250 mm, 500 mm, 750 mm]. Note that there is one channel for each unique pair of (time interval, threshold) parameters, giving rise to a total of 36 channels for the target.

For each channel and a pixel in the channel, let the maximum water level over the area represented by the pixel be denoted as p. The method for calculating, for the area represented by the pixel, the maximum water level is specified below.

Let the area of the patch that is represented by the pixel be denoted as the area. The water level in the area for a day (i.e. daily water level) is calculated by taking the average of all available water levels for that day across type 2 points in the area. If there are no type 2 points in the area for which there is historical data for the daily water level for the type 2 point, then the daily precipitation amount is deemed invalid.

The water level over a contiguous seven-day window is calculated by taking the sum of all seven consecutive daily water levels within the seven-day window. If there is no available daily water level historical data at the middle point for any day of the seven-day window, then the water level over the contiguous seven-day window is deemed invalid and is not used for calculating the maximum water level.

The maximum water level is calculated by taking the maximum of all valid daily water levels over days contained in the time window. If the maximum water level is incalculable (i.e. there are no valid water levels over contiguous seven-day windows contained in the time window), then the maximum water level is set to −1.

For a pixel in the channel, the value for the pixel indicates whether p (recall p denotes the maximum water level for a pixel) is greater than or equal to the threshold for the channel. In the target for each data instance, if sufficient data is available to calculate p (i.e. p is not −1), then the value for the pixel will either be 0 if p is less than the threshold or 1 if p is greater than or equal to the threshold. However, if there isn't enough data to calculate p (i.e. p is −1), the value for the incalculable pixel is set to −1. Furthermore, if the time interval for a channel goes beyond the date interval of the historical data, then all the pixel values in that channel are set to −1.

Step 3: The dataset obtained in step 2 that comprises all of the valid sampled data instances is randomly divided into training and validation partitions as referenced in 110 from FIG. 1. In some embodiments, the number of data instances in the training partition, denoted by t, is equal to floor(80*h/100) where h is the number of data instances in the dataset and all of the data instances in the dataset that are not in the training partition are part of the validation partition (it is assumed that h is at least 5); this partitions the data instances into a roughly 80% training and 20% validation split. To randomly divide the dataset into training and validation partitions, randomly select a data instance from the dataset, put it in the training partition, and remove it from the dataset. Keep repeating this process until the number of data instances in the training partition is t. The reduced dataset (that is obtained after removing all of the data instances in the training partition from the original dataset obtained in step 2) constitutes the validation partition.

Figure 4:
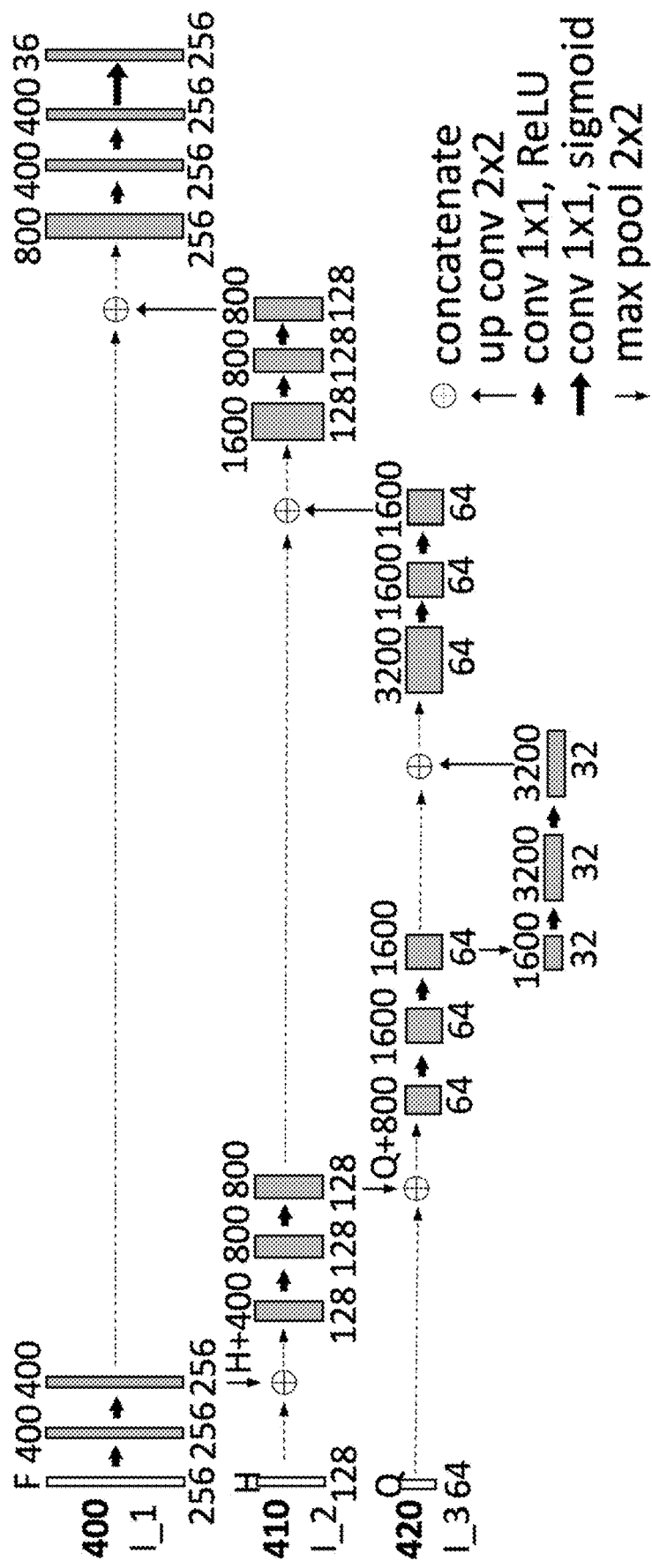
FIG. 4 is a diagram depicting an exemplary modified U-Net architecture for the neural network-based flood forecasting model. The modified U-Net architecture comprises up convolution, max pooling, convolution +ReLU, convolution +sigmoid, and concatenation layers. These layers generate intermediate representations in the form of three-dimensional tensors which can be fed into other layers of the neural network. For the remainder of this paragraph, the term "intermediate representation" will hereafter be shortened to "representation".

Step 4: Neural network and training hyperparameters are set as referenced in 115 from FIG. 1. In some embodiments, the neural network employs a modification of a contraction-expansion ("U-Net") architecture, built with a set of layer types comprising convolutional, rectified linear (ReLU), sigmoid, max pooling, up convolution, and concatenation layers. The term "intermediate representation" will hereinafter be shortened to "representation". The arrangement of a standard U-Net architecture will be readily appreciated by those of ordinary skill in the art. Because there are three resolution tensors that constitute the input for a data instance, we formulate appropriate modifications (described below) of the standard U-Net architecture to accommodate these different resolution tensors. An exemplary modified U-Net architecture is structured in FIG. 4. Note that the structure of the modified U-Net (the exemplary modified U-Net depicted in FIG. 4 for reference) naturally divides the layers of the U-Net into different depth levels, where the layers at the top of the modified U-Net have depth 1, layers right below the representations having depth 1 have depth 2, and so on. For example, the modified U-Net depicted in FIG. 4 has a total depth of 4, and thus comprises four different depth levels (depth 1, depth 2, depth 3, and depth 4). To calculate the total depth, add one to the number of max pool layers in the modified U-Net. We impose two constraints on the modified U-Net architecture. The first constraint on the modified U-Net architecture is that the total depth of the modified U-Net is at least 3. This constraint is required when specifying the modified U-Net architecture in the following paragraph.

To obtain a modified U-Net architecture based off of a standard U-Net architecture, we add two concatenation layers to the standard U-Net, one in front of the foremost layer of the standard U-Net having depth 2 and one in front of the foremost layer of the standard U-Net having depth 3. Note that with each concatenation layer takes as input a new tensor that is not an intermediate representation. For X=1, 2, and 3, we denote I_X as the foremost tensor in this modified U-Net having depth X. In the exemplary modified U-Net in FIG. 4, I_1 is denoted by 400 (the black border box having dimensions F×256×256), I_2 is denoted by 410 (the black border box having dimensions H×128×128), and I_3 is denoted by 420 (the black border box having dimensions Q×64×64). The second constraint on the modified U-Net model architecture is that I_1 has dimensions equal to that of the high-resolution tensor for a data instance (i.e. has dimensions F×256×256), I_2 has dimensions equal to that of the half-resolution tensor (i.e. has dimensions H×128×128), and I_3 has dimensions equal to that of the quarter-resolution tensor (i.e. has dimensions Q×64×64). Note that if H=0, then I_2 is effectively removed from the U-Net (so the concatenation layer joining I_2 to the main U-Net architecture just returns the representation at the stem of the other arrow that is pointing to the concatenation operation). Similarly, if Q=0, then I_3 is effectively removed from the U-Net. Observe that a standard U-Net architecture follows whenever H and Q are both zero. Other features of the modified U-Net architecture, such as the number of layers in the modified U-Net and the total depth of the modified U-Net, are neural network hyperparameters and can be adjusted accordingly based on training and validation results.

It will be appreciated by persons of ordinary skill in the art that such neural network hyperparameters, standard to this particular type of neural network model, include but are not limited to the number of layers and the total depth of the modified U-Net, conditioned on the two constraints on the neural network architecture mentioned in the above paragraphs.

Training hyperparameters are also set in step 4 of the method. An example of a training hyperparameter is the number of epochs (that is, the number of times the training partition is run through the model). Another example of a training hyperparameter is the loss function. The inventor contemplates using the MSE (mean squared error) function as the loss function.

To exemplify how a loss function such as MSE is used, for a data instance, the (output, target) pair is obtained where the output is obtained from passing the input of a data instance through the neural net, and the target is the target for the data instance. Then, the loss, using the MSE loss function, is computed by taking the MSE between corresponding elements of the output and target and summing all element-wise MSEs up. Note that unknown values (which are equal to −1) in the target are not used to compute element-wise MSEs and thus do not contribute to the MSE error term.

It will be appreciated by persons of ordinary skill in the art that such training hyperparameters, standard to this particular type of neural network model, include but are not limited to the number of epochs, the loss function, the learning rate, and any standard hyperparameters of the nonconvex optimization method mentioned below.

Step 5: After neural network and training hyperparameters are set, the neural network is trained as referenced in 120 from FIG. 1. The dataset used during training is the training partition. In some embodiments, training is performed by passing the training partition through the neural network a number of times equal to the number of epochs (a training hyperparameter mentioned in Step 4). For each data instance of the training partition, pass the full-resolution tensor, half resolution tensor, and quarter resolution tensor for the input of the data instance into I_1, I_2, and I_3 respectively of the modified U-Net to obtain an output, obtain the loss between the output and the target of the data instance using the loss function, and perform backpropagation of the loss function to compute the gradients for the neural network parameters. It will be appreciated by those of ordinary skill in the art that the neural network's parameters should be updated after each backpropagation, using standard methods in the nonconvex optimization of neural networks such as stochastic gradient descent, stochastic gradient descent with momentum, Adam, or other commonly-accepted optimization methods for neural networks. Because it is impossible to compare a value in the output of the neural network for a data instance with unknown values in the target, backpropagation is not performed on the elements of the target in the neural network corresponding to unknown values (i.e., elements that are set to −1) in the target so that gradients from those elements do not contribute to the neural network's training.

Step 6: The neural network is validated on the validation partition as referenced in 125 from FIG. 1. For example, for each data instance in the validation set, the input of the data instance is passed through the trained neural network and error terms are computed between the output and target of each data instance.

It is possible, though not required for the performance of the method, to use the validation results to further improve the neural network-based flood forecasting model. Specifically, based on the error terms calculated during validation, the neural network and training hyperparameters can be configured to a new set of values in returning to step 4, and the neural network with the reconfigured neural network hyperparameters can be trained with reconfigured training hyperparameters as in step 5 and validated as in step 6. Those of ordinary skill in the art will recognize this technique as "hyperparameter tuning," and any commonly-accepted hyperparameter tuning method in the prior art may be employed. This process can be repeated until desired. Then the flood forecasting model is ready for short to long-term flood forecasting.

Figure 5:
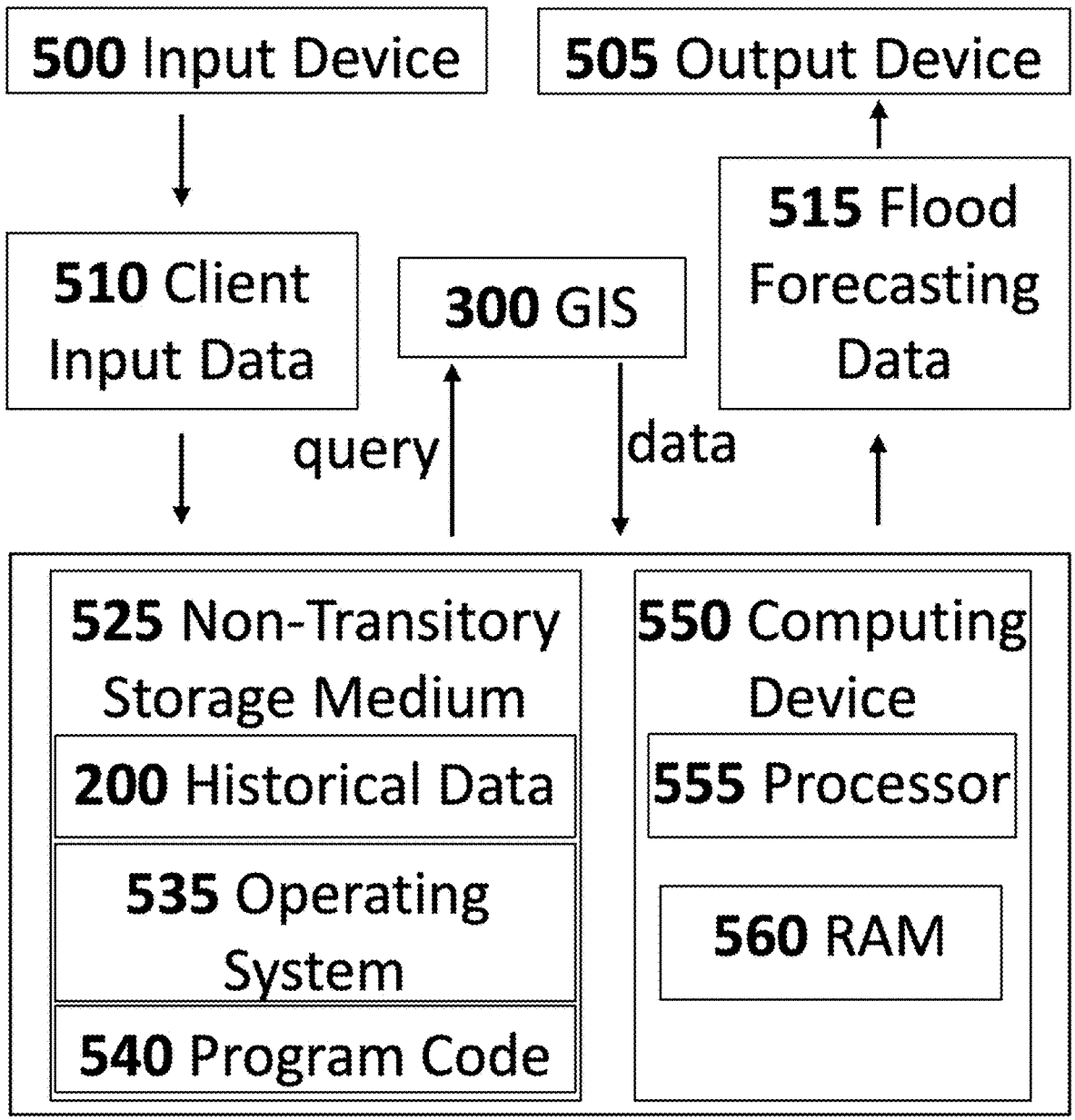
FIG. 5 is a diagram depicting the system for short to long-term flood forecasting, comprising an input device, an output device, connection to a GIS (geographic information system), at least one computing device (which comprises at least one processor and RAM (random access memory)), and a non-transitory physical storage medium.

FIG. 5 depicts a structural overview of the system for the short to long-term flood forecasting model. The system comprises an input device 500, an output device 505, connection to a GIS 300, at least one computing device 550 (which comprises at least one processor 555 and RAM (random access memory) 560), and a non-transitory physical storage medium 525 to store historical data 200, program code 540, the operating system 535, and any other information generated when the computing device runs the program code. Below is a description of each part.

The system includes an input device through which requests are inputted. The input device can be a desktop computer, a remote server, or any other device capable of sending client input data 510 to the computing device 550 which will store the data in the non-transitory storage medium 525. The client input data comprises a fixed rectangular region and one or more (patch, reference date) pairs in which (1) the patch is contained within the fixed region, (2) the patch contains at least 50% of its input, (3) the patch contains at least 1 square kilometer of land (to account for small areas of land such as islands, and (4) the reference date is within the fixed date interval of the historical data whose endpoints are the earliest and latest days for which historical water level data exists.

The system includes at least one computing device and a non-transitory storage medium 525. The non-transitory storage medium 525 can store (but is not limited to) (1) program code 540 that implements, using the client inputted fixed rectangular region, the method, (2) historical data 200 used (in conjunction with data queried from a GIS) to train and validate the neural network described in the method, and (3) the operating system 535 that the program code runs on. Each computing device comprises one or more processors and RAM. It will be appreciated by people of ordinary skill in the art that the RAM functions, among other things, to temporarily store program code and data in the course of executing the method. 550 shows an exemplary computing device with one processor 555 and RAM 560. The processor(s) in the computing device(s) runs program code stored within the non-transitory storage medium. Program code is referred to as a set of instructions that is read by the computing devices, which causes them to perform the actions contained within the program code; for example, training and validation instructions for the neural net can be stored as program code.

Included in the system is a connection to a GIS (geographic information system). As specified in the method, the computing devices in the flood prediction model query the GIS for geographic information and the GIS returns the queried data to be used by the computing devices.

After the method for generating the short to long-term flood forecasting model is completed via the system, the system can then accept and process client requests. The requests contain client input data consisting of a set of (patch, reference date) pairs, which is used to obtain a set of data inputs (one data input for each (patch, reference date) pair) in the same fashion as in computing the input for a data instance based on its (patch, reference date) pair during step 2 of the method. This set of data inputs is processed one by one via inferential execution of the neural network (that is, running the neural network on the input without gradient calculation or backpropagation), and a set of outputs, where each output corresponds to a data input, is produced. Each output in the set of outputs has dimensions 36×256×256 and contains the short to long-term flood forecasting for the (patch, reference date) pair associated with the data input. The set of outputs is called the flood forecasting data 515.

The flood forecasting data can then be transmitted to an output device 505. In some embodiments, the output device is the same device as the input device (e.g. saved to the same desktop computer that sent the client input data). In other embodiments, the flood forecasting data can be transmitted to an output device that is different from the input device, such as another computer or server, via local-area or wide-area computer networking.

The invention claimed is:

1. A method for generating a predicting flooding likelihood in a given region over short to long term time intervals, comprising:
    obtaining historical data from the region;
    sampling and structuring the historical data in conjunction with geographic data queried from a geographic information system into a dataset which comprises a set of data instances, where each data instance comprises an input and a target;
    dividing the dataset into pre-processed training and validation partitions;
    configuring neural network and training hyperparameters for a neural network-based flood forecasting model, where the neural network used in the neural network-based flood forecasting model employs a modification of a contraction-expansion U-Net architecture, built with a set of layer types comprising convolutional, rectified linear, sigmoid, max pooling, up convolution, and concatenation layers, said modification being the addition of a concatenation layer that joins an input half resolution tensor to the foremost intermediate representation with depth 2 in the U-Net and a concatenation layer that joins an input quarter resolution tensor to the foremost intermediate representation with depth 3 in the U-Net;
    training the neural network-based flood forecasting model on the pre-processed training partition;
    performing validation on the neural network-based flood forecasting model with the pre-processed validation partition; and
    generating a predicting flooding likelihood in given region over short to long term time intervals using the trained and validated neural network-based flood forecasting model.

2. The method of claim 1, wherein the input of a data instance is passed through the modified U-Net by inputting the full-resolution tensor, half resolution tensor, and quarter resolution tensor for the input of the data instance into the modified U-Net to obtain an output. during training and validation of the modified U-Net.

3. A system for generating a predicting flooding likelihood in a given region over short to long term time intervals, comprising:
    an input device;
    an output device;
    connection to a geographic information system;
    at least one computing device which comprises at least one processor and random access memory; and
    a non-transitory physical storage medium to store historical data, the operating system, and program code that, when executed by one or more computing devices, causes the one or more computing devices to:
    obtain historical data from the region;
    sample and structure the historical data in conjunction with geographic data queried from a geographic information system into a dataset which comprises a set of data instances, where each data instance comprises an input and a target;
    divide the dataset into pre-processed training and validation partitions;
    configure neural network and training hyperparameters for a neural network-based flood forecasting model, where the neural network used in the neural network-based flood forecasting model employs a modification of a contraction-expansion U-Net architecture, built with a set of layer types comprising convolutional, rectified linear, sigmoid, max pooling, up convolution, and concatenation layers, said modification being the addition of a concatenation layer that joins an input half resolution tensor to the foremost intermediate representation with depth 2 in the U-Net and a concatenation layer that joins an input quarter resolution tensor to the foremost intermediate representation with depth 3 in the U-Net;
    train the neural network-based flood forecasting model on the pre-processed training partition;
    perform validation on the neural network-based flood forecasting model with the pre-processed validation partition; and
    generate a predicting flooding likelihood in given region over short to long term time intervals using the trained and validated neural network-based flood forecasting model.

4. The system of claim 3, wherein the program code additionally contains subroutines for climate forecasting that, when executed by one or more computing devices causes the one or more computing devices to:
    receive client data through an input device;
    inferentially execute the trained and validated neural network-based short to long-term flood forecasting model on the client data to generate flood forecasting data; and
    send the generated flood forecasting data to an output device.

* * * * *